United States Patent
Conlan

(10) Patent No.: US 9,291,306 B2
(45) Date of Patent: Mar. 22, 2016

(54) OIL FILTER CHANGING SYSTEM

(71) Applicant: Patrick Conlan, Morgan Hill, CA (US)

(72) Inventor: Patrick Conlan, Morgan Hill, CA (US)

( * ) Notice: Subject to any disclaimer, the term of this patent is extended or adjusted under 35 U.S.C. 154(b) by 0 days.

(21) Appl. No.: 14/272,894

(22) Filed: May 8, 2014

(65) Prior Publication Data

US 2015/0323131 A1    Nov. 12, 2015

(51) Int. Cl.
*F16N 31/00* (2006.01)
*B65D 25/22* (2006.01)
*F16M 13/02* (2006.01)

(52) U.S. Cl.
CPC .............. *F16N 31/006* (2013.01); *B65D 25/22* (2013.01); *F16M 13/02* (2013.01); *F16N 31/00* (2013.01)

(58) Field of Classification Search
USPC .................. 248/317, 318, 311.2, 312, 312.1; 220/571, 571.1, 573, 761
See application file for complete search history.

(56) References Cited

U.S. PATENT DOCUMENTS

| | | | | |
|---|---|---|---|---|
| 4,032,102 | A * | 6/1977 | Wolf et al. | 248/318 |
| D311,679 | S * | 10/1990 | Morris | D8/373 |
| 5,242,032 | A * | 9/1993 | Prestwood et al. | 184/1.5 |
| 5,390,888 | A * | 2/1995 | Rogers | 248/318 |
| D365,259 | S | 12/1995 | Littlejohn | |
| 5,586,413 | A * | 12/1996 | Sharon | 47/67 |
| 5,623,755 | A | 4/1997 | Childress et al. | |
| 6,517,063 | B2 | 2/2003 | Beyer | |
| 7,846,330 | B2 | 12/2010 | Nelson | |
| D632,715 | S | 2/2011 | Chikigak | |
| 8,220,655 | B2 * | 7/2012 | Millstein | 220/636 |
| 2008/0169293 | A1 | 7/2008 | Kurtz et al. | |
| 2009/0230644 | A1 * | 9/2009 | Stanley | 280/43 |
| 2012/0325873 | A1 * | 12/2012 | Stocco | 224/267 |

FOREIGN PATENT DOCUMENTS

EP        2284367        11/2010

* cited by examiner

*Primary Examiner* — Alfred J Wujciak

(57) ABSTRACT

An oil filter changing system provides a place to store an oil filter underneath a vehicle while changing oil in the vehicle. The device includes a tray having a bottom wall and a perimeter wall coupled to and extending upwardly from a peripheral edge of the bottom wall. A top edge of the perimeter wall provides access to an interior of the tray. An oil filter is provided. The bottom wall of the tray receives the oil filter thereon. A vehicle is provided having a frame. A mounting assembly is attached to the perimeter wall of the tray and supports the tray from the frame of the vehicle.

9 Claims, 4 Drawing Sheets

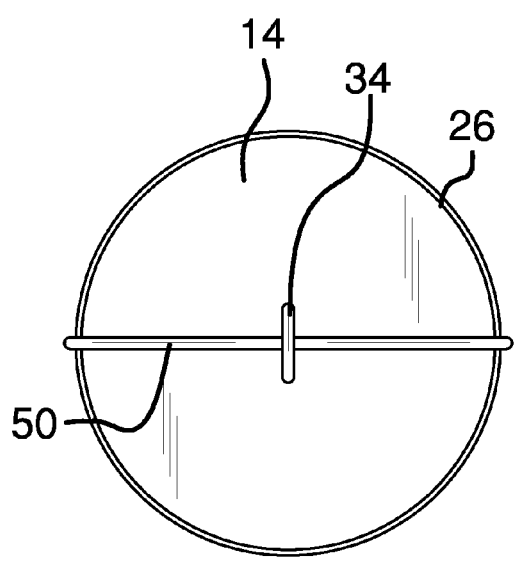
FIG. 2
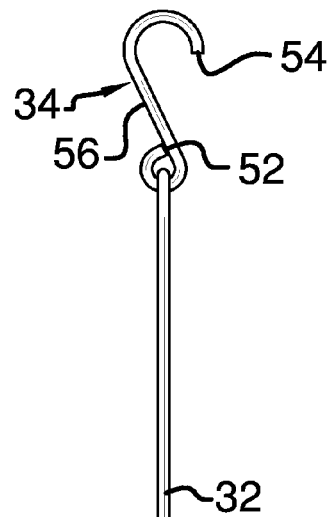
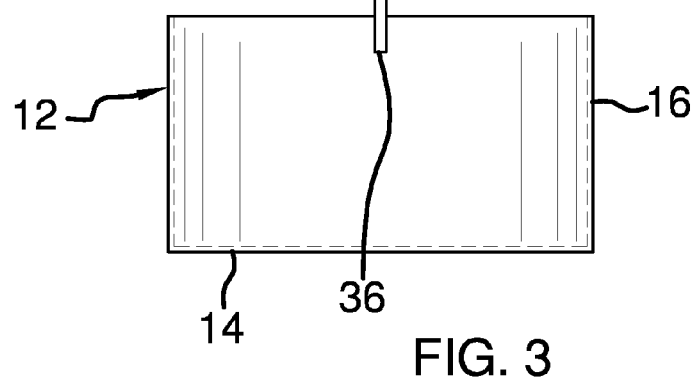
FIG. 3

OIL FILTER CHANGING SYSTEM

BACKGROUND OF THE DISCLOSURE

Field of the Disclosure

The disclosure relates to car maintenance systems and more particularly pertains to a new car maintenance system for providing a place to store an oil filter underneath a vehicle while changing oil in the vehicle.

SUMMARY OF THE DISCLOSURE

An embodiment of the disclosure meets the needs presented above by generally comprising a tray having a bottom wall and a perimeter wall coupled to and extending upwardly from a peripheral edge of the bottom wall. A top edge of the perimeter wall provides access to an interior of the tray. An oil filter is provided. The bottom wall of the tray receives the oil filter thereon. A vehicle is provided having a frame. A mounting assembly is attached to the perimeter wall of the tray and supports the tray from the frame of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a side view of an embodiment of the disclosure.

DESCRIPTION OF THE PREFERRED EMBODIMENT

Figure 1:
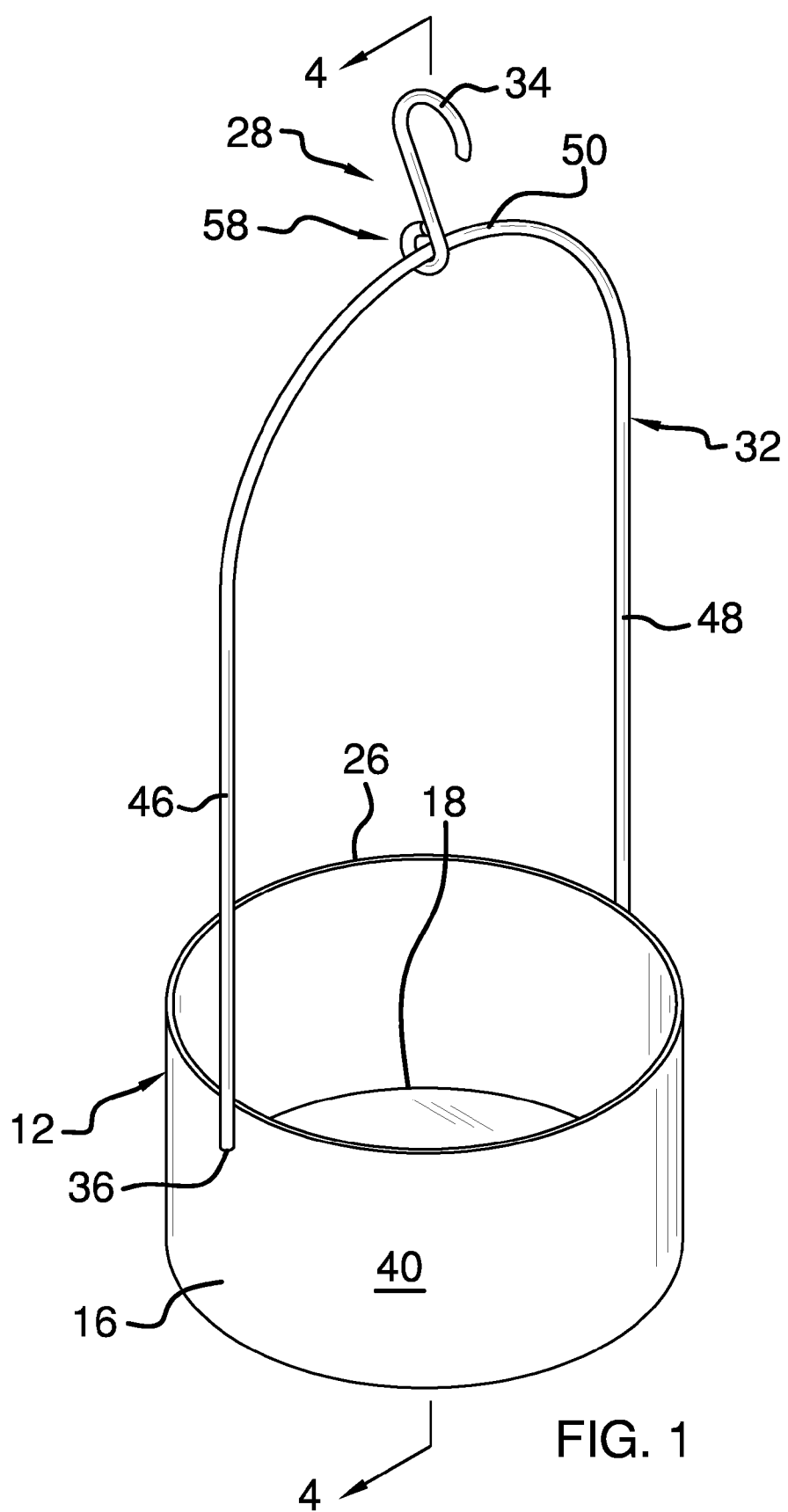
FIG. 1 is a top front side perspective view of an oil filter changing system according to an embodiment of the disclosure.
Figure 4:
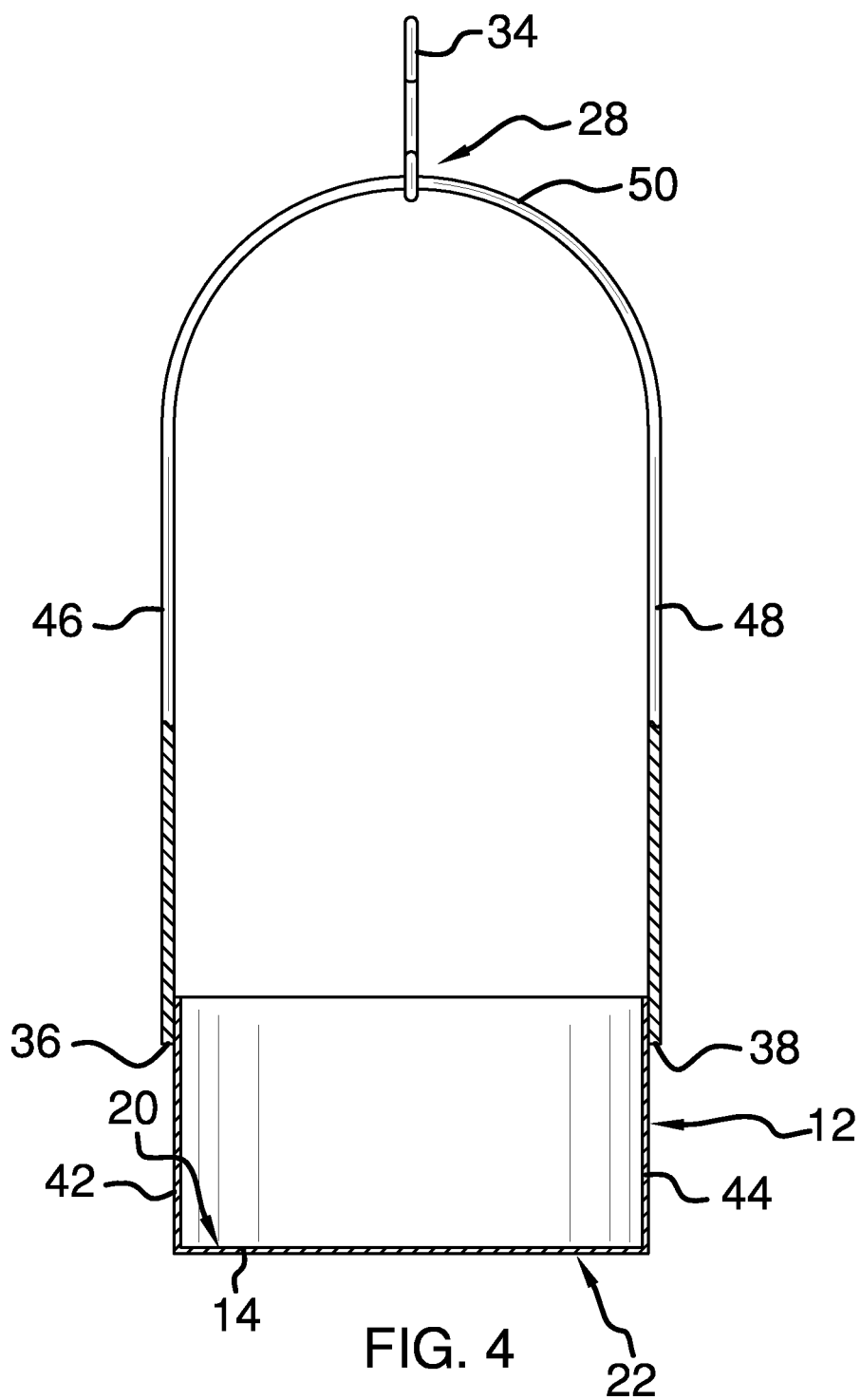
FIG. 4 is a cross-sectional view of an embodiment of the disclosure taken along line 4-4 of FIG. 1.
Figure 5:
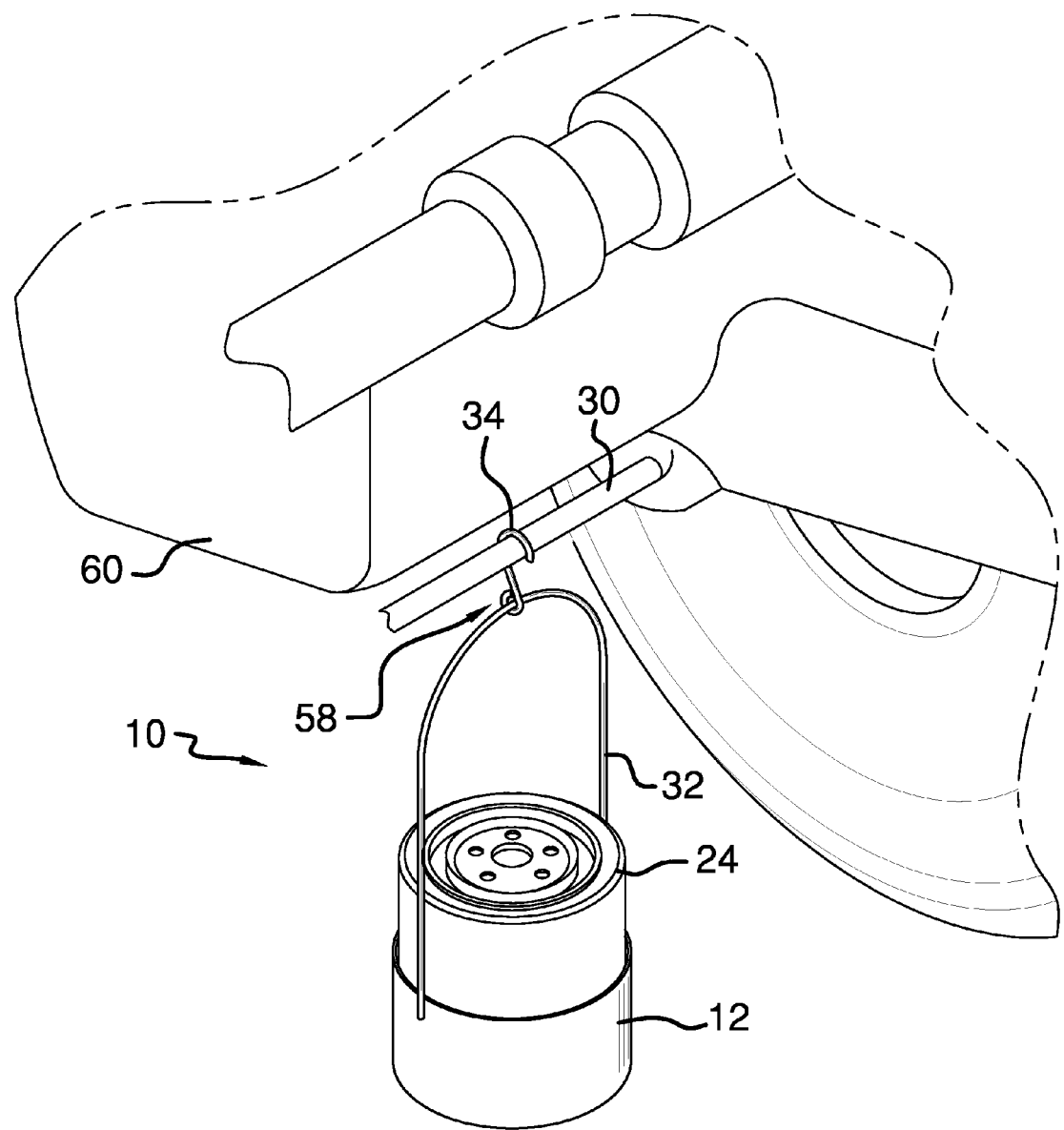
FIG. 5 is a top front side perspective view of an embodiment of the disclosure in use.

With reference now to the drawings, and in particular to FIGS. 1 through 5 thereof, a new car maintenance system embodying the principles and concepts of an embodiment of the disclosure and generally designated by the reference numeral 10 will be described.

As best illustrated in FIGS. 1 through 5, the oil filter changing system 10 generally comprises a tray 12 having a bottom wall 14 and a perimeter wall 16 coupled to and extending upwardly from a peripheral edge 18 of the bottom wall 14. The bottom wall 14 has an upper surface 20 and a lower surface 22 that may each be planar. The bottom wall 14 receives an oil filter 24 thereon to facilitate the process of changing oil in a vehicle 60. The vehicle 60 may include an automobile or heavy machinery, such as a tractor or the like. The size of the tray 12 may vary according to the size of the oil filter 24 used for each particular vehicle 60. A top edge 26 of the perimeter wall 16 provides access to an interior of the tray 12. The tray 12 may be constructed from a rigid material, such as plastic, metal or the like.

A mounting assembly 28 is attached to the perimeter wall 16 of the tray 12 and supports the tray 12 from a frame 30 of the vehicle 60. The mounting assembly 28 includes a handle 32 having a first end 36 and a second end 38 each attached to the perimeter wall 16, and more particularly, to an exterior surface 40 of the perimeter wall 16. Each of the first 36 and second 38 ends of the handle 32 may be fixedly attached to the perimeter wall 16. The first end 36 of the handle 12 is attached to a first side 42 of the perimeter wall 16 and the second end 38 of the handle 32 is attached to a second side 44 of the perimeter wall 16. The handle 32 has a pair of arms 46, 48 and a medial section 50 coupled to and extending between each of the arms 46, 48. The medial section 50 of the handle 32 is spaced above the top edge 26 of the perimeter wall 16. The medial section 50 of the handle 32 may be arcuate. The device 10 may have a height extending from the bottom wall 14 to a center of the medial section 50 measuring between approximately 22.0 cm and 35.0 cm, though this distance may vary in order to accommodate the size of oil filter 24 being used.

The mounting assembly 28 further includes a hook 34. The hook 34 is attached to the handle 32. The hook 34 has a proximal end 52 and a distal end 54 with respect to the handle 32 wherein each of the proximal 52 and distal 54 ends may be curved. The hook 34 further includes a peripheral surface 56 coupled to and extending between the proximal end 52 and the distal end 54. The proximal end 52 may be attached to the peripheral surface 56 to form a closed loop 58 spaced from the distal end 54. This will allow the closed loop 58 to extend around the handle 32 so that the hook 32 is slidable along a length of the handle 32.

In use, a person brings both the device 10 and an oil filter 24 underneath the frame 30 of a vehicle 60 wherein the new oil filter 24 is intended to replace the existing oil filter 24 in the vehicle 60. The device 10 is suspended from the frame 30 using hook 34. Unlike similar inventions known in the prior art, the device 10 of the present invention does not require screws, clamps or the like and provides for easier attachment to the frame 30. The existing oil filter 24 is then removed from the vehicle 60 and placed into the tray 12 in an upright position so that fluid collected in the oil filter 24 cannot drain downwardly into the tray 12. The replacement oil filter 24 is then attached to the vehicle in a conventional manner. The oil filter 24 can be removed from the tray 12 and its contents poured into an appropriate hazardous waste container for disposal. In this manner, the device 10 helps prevent oil spillage and minimizes the mess created while performing an oil change in a vehicle 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An oil filter changing system comprising:
   a tray having a bottom wall and a perimeter wall coupled to and extending upwardly from a peripheral edge of said bottom wall, a top edge of said perimeter wall providing access to an interior of said tray;
   an oil filter, said bottom wall of said tray receiving said oil filter thereon;
   a vehicle having a frame; and
   a mounting assembly coupled to said perimeter wall of said tray and supporting said tray from said frame of said vehicle, wherein said mounting assembly includes a handle having a first end and a second end each attached to said perimeter wall, wherein the mounting assembly further includes a hook attached to the handle for supporting the tray from the frame.

2. The device of claim 1, further comprising said bottom wall having an upper surface being planar.

3. The device of claim 1, further comprising wherein each of said first and second ends of said handle is fixedly attached to said perimeter wall.

4. The device of claim of claim 1, further comprising wherein said first end of said handle is attached to a first side of said perimeter wall and said second end of said handle is attached to a second side of said perimeter wall, said handle having a pair of arms and a medial section coupled to and extending between each of said arms.

5. The device of claim 4, further comprising said medial section of said handle being spaced above said top edge of said perimeter wall.

6. The device of claim 4, further comprising said medial section of said handle being arcuate.

7. The device of claim 4, wherein, said hook having a proximal and a distal end with respect to said handle, said hook being S-shaped wherein each of said proximal and distal ends are curved.

8. The device of claim 7, further comprising said hook including a peripheral surface coupled to and extending between said proximal and distal ends, said proximal end being attached to said peripheral surface to form a closed loop spaced from said distal end, said closed loop extending around said handle such that said hook is slidable along a length of said handle.

9. An oil filter changing system comprising:
   a tray having a bottom wall and a perimeter wall coupled to and extending upwardly from a peripheral edge of said bottom wall, said bottom wall having an upper surface and a lower surface each being planar, a top edge of said perimeter wall providing access to an interior of said tray;
   an oil filter, said bottom wall of said tray receiving said oil filter thereon;
   a vehicle having a frame; and
   a mounting assembly coupled to said perimeter wall of said tray and supporting said tray from said frame of said vehicle, said mounting assembly including;
      a handle having a first end and a second end each attached to an exterior surface of said perimeter wall, each of said first and second ends of said handle being fixedly attached to said perimeter wall, said first end of said handle being attached to a first side of said perimeter wall and said second end of said handle being attached to a second side of said perimeter wall, said handle having a pair of arms and a medial section coupled to and extending between each of said arms, said medial section of said handle being spaced above said top edge of said perimeter wall, said medial section of said handle being arcuate; and
      a hook attached to said handle, said hook having a proximal and a distal end with respect to said handle, said hook being S-shaped wherein each of said proximal and distal ends are curved, said hook including a peripheral surface coupled to and extending between said proximal and distal ends, said proximal end being attached to said peripheral surface of said hook to form a closed loop spaced from said distal end, said closed loop extending around said handle such that said hook is slidable along a length of said handle, wherein the hook supports the tray from the frame.

\* \* \* \* \*